· US009713129B2

(12) United States Patent
Cordeiro et al.

(10) Patent No.: US 9,713,129 B2
(45) Date of Patent: Jul. 18, 2017

(54) TRAFFIC ENGINEERING IN HETEROGENEOUS MILLIMETER-WAVE AND LTE SMALL CELL SYSTEMS

(71) Applicant: Intel Corporation, Santa Clara, CA (US)

(72) Inventors: Carlos Cordeiro, Portland, OR (US); Martin Hans, Bad Salzdetfurth (DE); Michael Faerber, Wolfratshausen (DE); Andreas Schmidt, Braunschweig (DE); Pingping Zong, Randolph, NJ (US); Qian Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 14/577,766

(22) Filed: Dec. 19, 2014

(65) Prior Publication Data

US 2016/0183242 A1 Jun. 23, 2016

(51) Int. Cl.
*H04W 72/04* (2009.01)
*H04W 36/00* (2009.01)
(Continued)

(52) U.S. Cl.
CPC ...... *H04W 72/0413* (2013.01); *H04B 7/0689* (2013.01); *H04B 7/0871* (2013.01); *H04W 16/32* (2013.01); *H04W 36/0055* (2013.01); *H04W 36/0072* (2013.01); *H04W 36/22* (2013.01); *H04W 64/003* (2013.01); *H04L 5/0023* (2013.01); *H04W 16/28* (2013.01); *H04W 36/14* (2013.01); *H04W 76/025* (2013.01); *H04W 88/06* (2013.01); *H04W 92/20* (2013.01)

(58) Field of Classification Search
CPC ... H04B 7/2606; H04W 84/047; H04W 92/20
See application file for complete search history.

(56) References Cited

U.S. PATENT DOCUMENTS

2013/0308717 A1  11/2013  Maltsev et al.
2014/0098912 A1  4/2014  Yin et al.
(Continued)

FOREIGN PATENT DOCUMENTS

TW     201632015 A      9/2016
WO  WO-2016099728 A1   6/2016

OTHER PUBLICATIONS

"International Application Serial No. PCT/US2015/060597, International Search Report mailed Feb. 16, 2016", 3 pgs.
(Continued)

*Primary Examiner* — Chandrahas Patel
(74) *Attorney, Agent, or Firm* — Schwegman Lundberg & Woessner, P.A.

(57) ABSTRACT

Traffic engineering functionalities are described in a heterogeneous network that includes an anchor base station serving a cellular macro cell and booster base stations serving mmWave enabled small cells. The described functionalities are designed to cope with dynamic changes in the heterogeneous environment such as loss of a backhaul link between the anchor base station and the booster base station, loss of a link between a terminal and one of the base stations, and loss of beam forming in a mmWave link between the terminal and the booster base station.

20 Claims, 7 Drawing Sheets

(51) Int. Cl.

| | | |
|---|---|---|
| *H04W 36/22* | (2009.01) | |
| *H04W 64/00* | (2009.01) | |
| *H04B 7/06* | (2006.01) | |
| *H04B 7/08* | (2006.01) | |
| *H04W 16/32* | (2009.01) | |
| *H04L 5/00* | (2006.01) | |
| *H04W 88/06* | (2009.01) | |
| *H04W 36/14* | (2009.01) | |
| *H04W 16/28* | (2009.01) | |
| *H04W 76/02* | (2009.01) | |
| *H04W 92/20* | (2009.01) | |

(56) References Cited

U.S. PATENT DOCUMENTS

| | | |
|---|---|---|
| 2014/0206368 A1 | 7/2014 | Maltsev et al. |
| 2014/0206406 A1 | 7/2014 | Cordeiro et al. |
| 2014/0218236 A1 | 8/2014 | Sadeghi et al. |
| 2016/0165605 A1* | 6/2016 | Dimou .............. H04W 72/0453 370/329 |

OTHER PUBLICATIONS

"International Application Serial No. PCT/US2015/060597, Written Opinion mailed Feb. 16, 2016", 5 pgs.

"Taiwanese Application Serial No. 104137728, Office Action mailed Oct. 26, 2016", with English Translation, 7 pgs.

Rangan, Sundeep, et al., "Millimeter-wave cellular wireless networks: potentials and challenges", Proceedings of the IEEE, (Mar. 2014), 366-385.

Roh, Wonil, et al., "Millimeter-wave beamforming as an enabling technology for 5G cellular communications: theoretical feasibility and prototype results", Communications Magazine, IEEE, vol. 52, Issue: 2,, (Feb. 2014), 606-113.

* cited by examiner

| FUNCTIONALITIES FOR CAPACITY IMPROVEMENT DEPLOYMENT | | | BOOSTER eNB IS LTE CAPABLE | | BOOSTER eNB IS NOT LTE CAPABLE | |
|---|---|---|---|---|---|---|
| | | | CONTROL PLANE | USER PLANE | CONTROL PLANE | USER PLANE |
| ANCHOR eNB | | | SUPPORTS ALL CONTROL PLANE TO UE OR HAS COMPLIMENTARY FUNCTIONALITY TO THE BOOSTER eNB SUCH AS FOR MOBILITY SUPPORT. ASSISTS IN LOAD BALANCING ACROSS BOOSTER eNBs, NETWORK DETECTION, AMONG OTHERS. | BOOSTER eNB MAY CARRY ALL TRAFFIC TYPES, INCLUDING DELAY SENSITIVE TRAFFIC. ALTERNATIVELY, CAN RESTRICT BOOSTER eNB TO ONLY NON-DELAY SENSITIVE TRAFFIC AND KEEP ALL DELAY SENSITIVE TRAFFIC THROUGH THE ANCHOR eNB. | SUPPORTS ALL CONTROL PLANE TO UE. SELECTIVE CONTROL PLANE FUNCTIONS CAN BE ASSIGNED TO mmWAVE INTERFACE OF BOOSTER eNB. | CARRIES ALL DELAY SENSITIVE TRAFFIC TO UE. NON-DELAY SENSITIVE TRAFFIC MAY BE CARRIED BY mmWAVE INTERFACE OF BOOSTER. |
| BOOSTER eNB | LTE INTERFACE | | LTE INTERFACE CAN BE USED TO ASSIST IN SET UP OF mmWAVE LINK, INCLUDING BEAM FORMING, | LTE INTERFACE SUPPORTS ALL TRAFFIC TYPES, BUT CAN ALSO BE USED PRIMARILY FOR DELAY SENSITIVE TRAFFIC. | N/A | |
| | mmWAVE INTERFACE | | mmWAVE INTERFACE MAY OR MAY NOT SUPPORT CONTROL PLANE FUNCTIONALITY OR HAVE COMPLIMENTARY FUNCTIONALITY TO ANCHOR eNB | mmWAVE INTERFACE USED PRIMARILY FOR NON-DELAY SENSITIVE TRAFFIC. | mmWAVE INTERFACE MAY SUPPORT SELECTIVE CONTROL PLANE FUNCTIONS THAT ARE NOT HANDLED BY ANCHOR eNB. | mmWAVE INTERFACE USED PRIMARILY FOR NON-DELAY SENSITIVE TRAFFIC. |

Fig. 4A

| FUNCTIONALITIES FOR COVERAGE EXTENSION DEPLOYMENT | | | BOOSTER eNB IS LTE CAPABLE | | BOOSTER eNB IS NOT LTE CAPABLE | |
|---|---|---|---|---|---|---|
| | | | CONTROL PLANE | USER PLANE | CONTROL PLANE | USER PLANE |
| ANCHOR eNB | | | N/A (ANCHOR eNB MAY NOT BE PRESENT) | | | |
| BOOSTER eNB | LTE INTERFACE | | LTE INTERFACE CAN BE USED TO ASSIST IN SET UP OF mmWAVE LINK, INCLUDING BEAM FORMING, | LTE INTERFACE SUPPORTS ALL TRAFFIC TYPES, BUT CAN ALSO BE USED PRIMARILY FOR DELAY SENSITIVE TRAFFIC. | N/A | |
| | mmWAVE INTERFACE | | mmWAVE INTERFACE MAY OR MAY NOT SUPPORT CONTROL PLANE FUNCTIONALITY OR HAVE COMPLIMENTARY FUNCTIONALITY TO ANCHOR eNB | mmWAVE INTERFACE USED PRIMARILY FOR NON-DELAY SENSITIVE TRAFFIC. | mmWAVE INTERFACE SUPPORTS FULL CONTROL PLANE. | mmWAVE INTERFACE SUPPORTS ALL ALL TRAFFIC IN USER PLANE. |

Fig.5C

TRAFFIC ENGINEERING IN HETEROGENEOUS MILLIMETER-WAVE AND LTE SMALL CELL SYSTEMS

TECHNICAL FIELD

Embodiments pertain to wireless communications. Some embodiments relate to cellular networks including networks operating in accordance with the 3GPP LTE and LTE-A standards. Some embodiments relate to small-cell deployment. Some embodiments relate to 5G cellular networks.

BACKGROUND

Heterogeneous cellular communication networks may include a macro cell layer will be accompanied by an additional small cell layer. For example, in an LTE/LTE-Advanced (Long Term Evolution) deployment, a terminal (referred to as a UE or user equipment) may be able to connect to a macro cell served by a base station (eNB or evolved Node B LTE) and to a small cell that is served by a small eNB where the macro cell overlays the small cell. These additional small cells may primarily be deployed for capacity improvement (e.g., in traffic hot spots) or for coverage enhancements (e.g., at macro cell edge, or in coverage holes of the macro cell layer, such as subway stations, shopping malls, etc.).

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In heterogeneous networks that include a macro cell and a small cell, the small cell layer may be served by small, low power base stations that may, for instance, be mounted at street furniture and the like. Small cell base stations (also referred to as "Booster eNBs" or simply "boosters") may offer access links to mobile devices (UEs according to LTE) using LTE radio access technology, mmWave (millimeter wave) technology, or both. For example, booster eNBs may be equipped with a mmWave interface and may also be referred to as mmWave capable small cells (MCSCs). The base station serving the macro cell may be referred to as an anchor eNB which connects to the booster eNB via a backhaul link.

The problems of a heterogeneous MCSC arise by the multitude of deployment options, and the fact that the capabilities are not static due to the propagation characteristics of the mmWave links. State of the art systems consider the backhaul link as a static characteristic and therefore do not consider configuration changes whilst in operation. Mobility aspects and RRC (Radio Resource Control) signaling demands are quite different in MCSCs, and known forms of splitting the U (user) and C (control) planes need enhanced procedures for the traffic engineering in order to avoid excessive mobility procedures.

Figure 1:
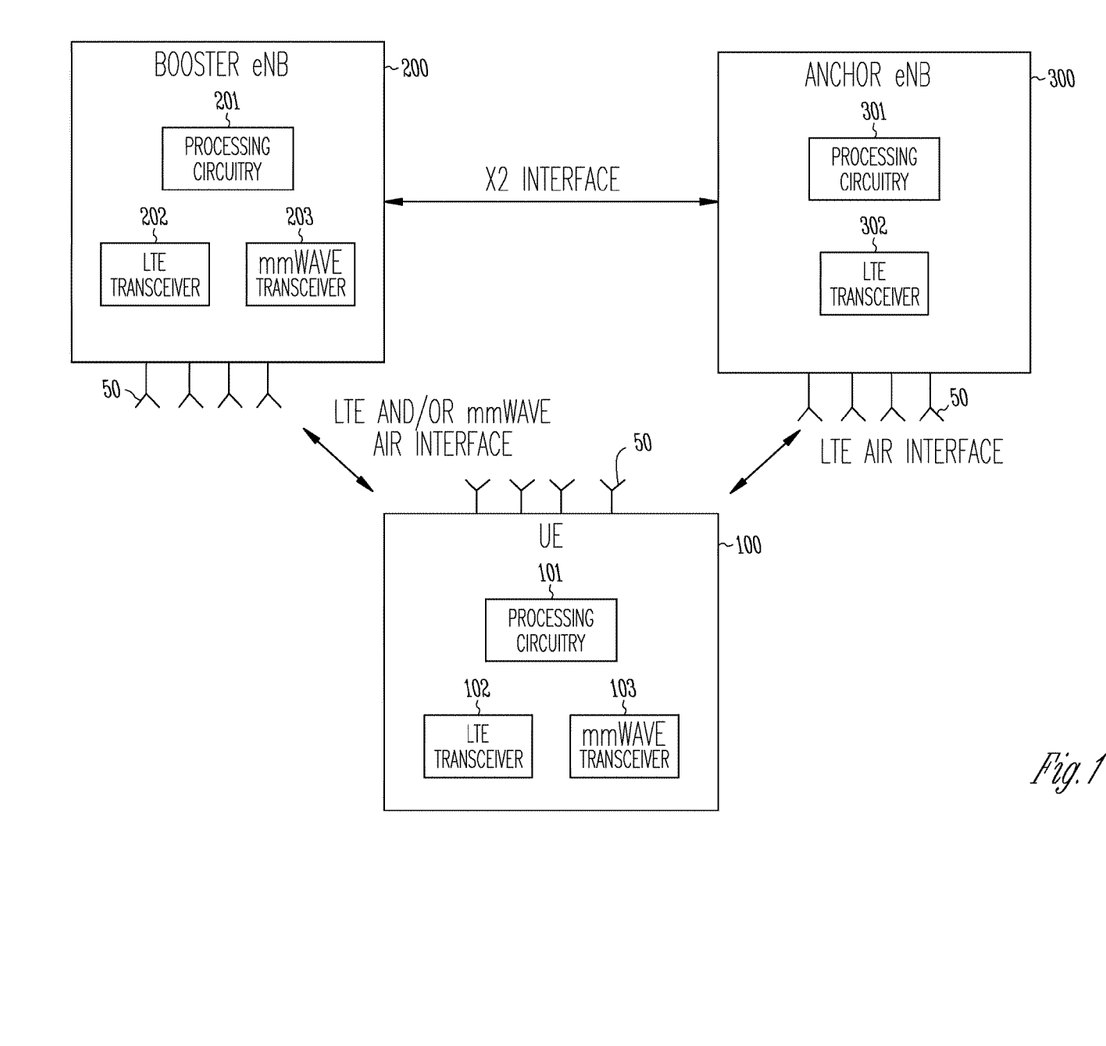
FIG. 1 illustrates the components of a heterogeneous mmWave and LTE network in accordance with some embodiments.

FIG. 1 illustrates an example of the components of a heterogeneous mmWave and LTE network made up of a UE 100, a booster eNB 200, and an anchor eNB 300. The UE 100 includes processing circuitry 101 connected to an LTE transceiver 102 for providing an LTE interface and connected to a mmWave transceiver for providing a mmWave interface. The booster eNB 200 includes processing circuitry 201 connected to an LTE transceiver 202 for providing an LTE interface and connected to a mmWave transceiver 203 for providing a mmWave interface. The anchor eNB 300 includes processing circuitry 301 connected to an LTE transceiver 302 for providing an LTE interface. Each of the transceivers in the devices are connected to antennas 50 that may be operated as a directional array (i.e., beam forming). The mmWave interface in particular requires beam forming to achieve adequate data transmission rates and an adequate coverage area. The mmWave interfaces of the UE 100 and booster eNB 200 may utilize a control mode before beam forming is established in which the antennas 50 are operated as an omnidirectional array. In the control mode, the UE 100 and booster eNB 200 exchange information to allow subsequent operation in a beam forming mode with higher data rates.

Figure 2:
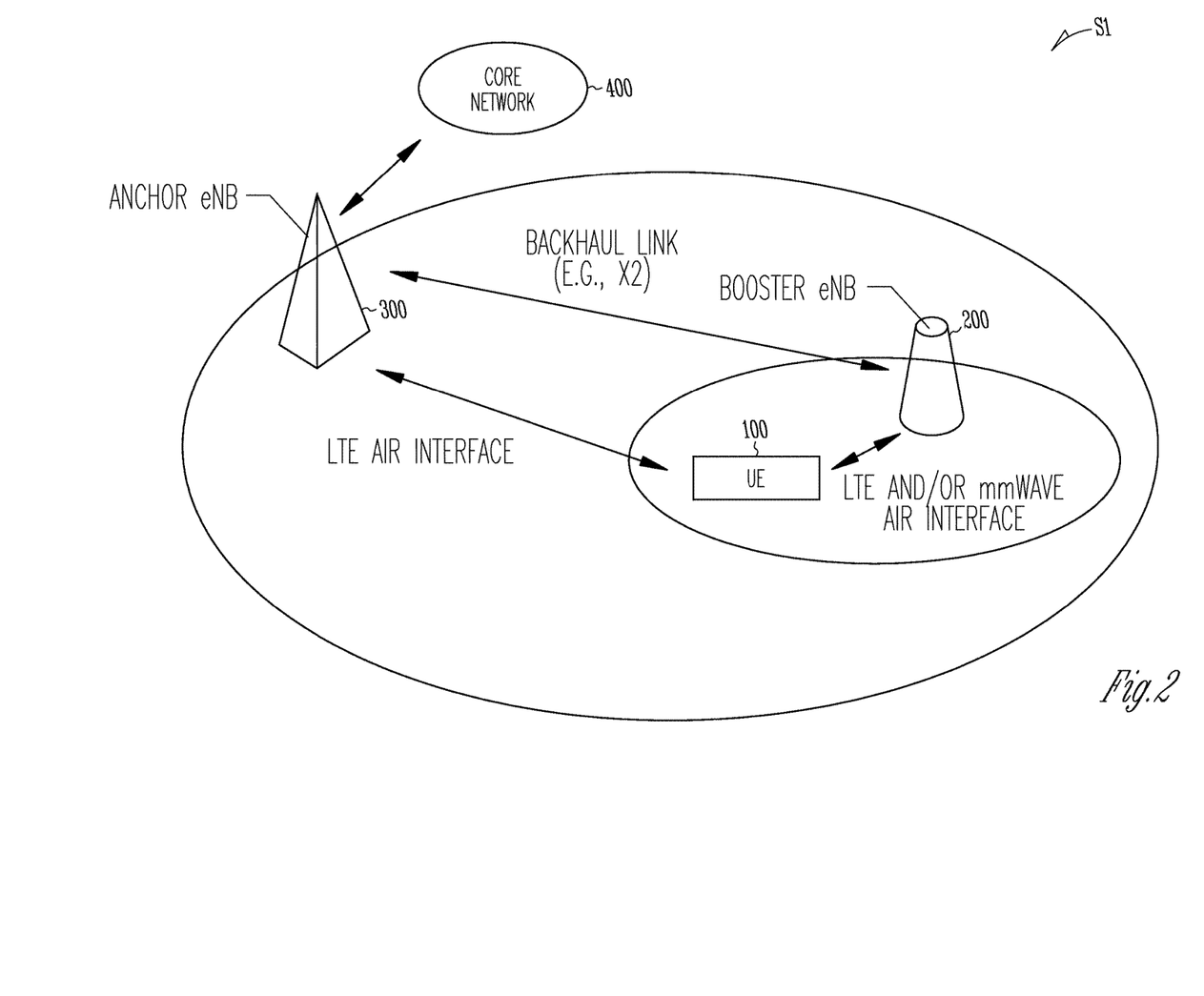
FIG. 2 illustrates an example of a capacity improvement type of heterogeneous network deployment in accordance with some embodiments.
Figure 3:
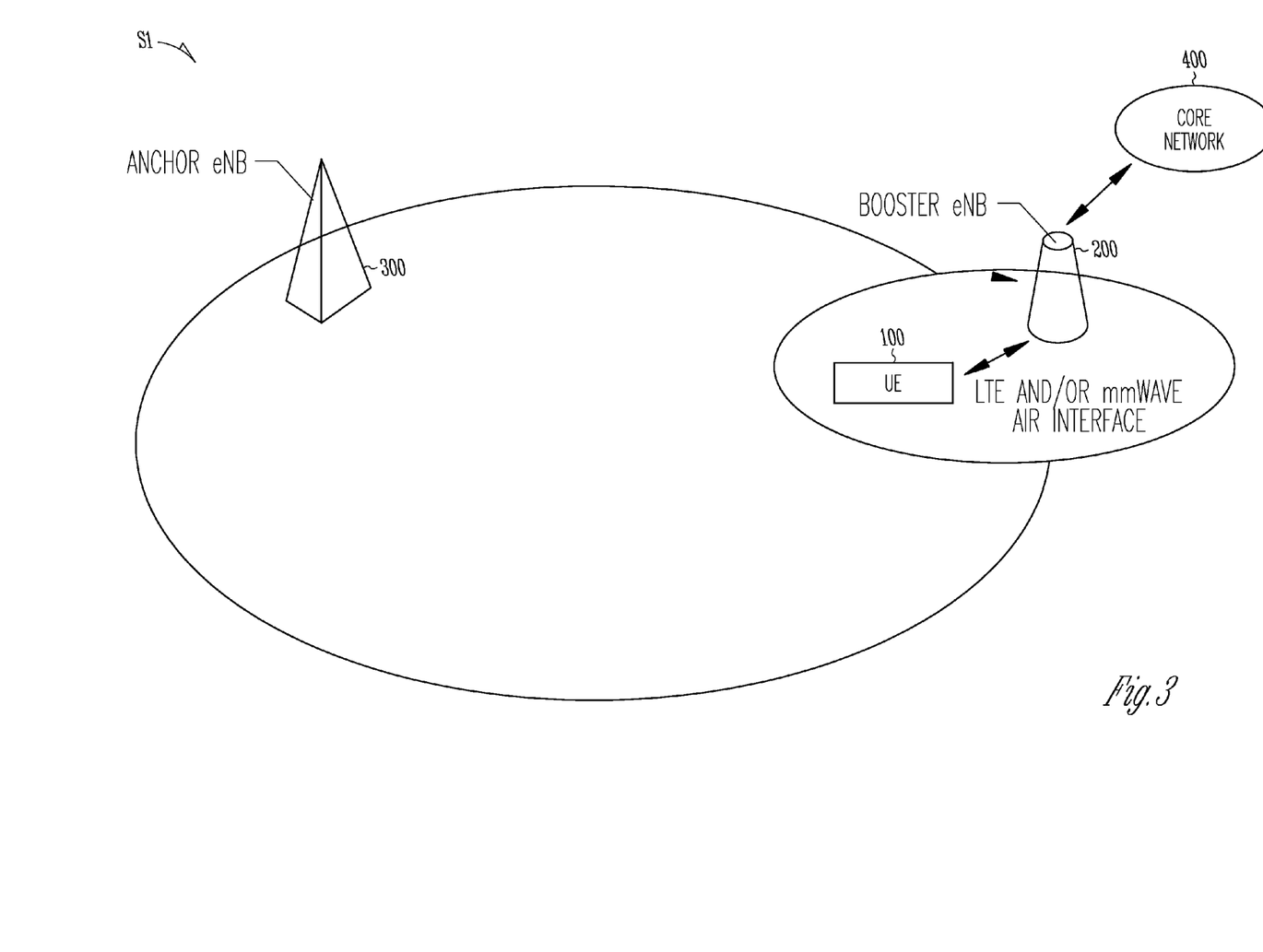
FIG. 3 illustrates an example of a coverage extension type of heterogeneous network deployment in accordance with some embodiments.

FIG. 2 illustrates the coverage areas of a heterogeneous mmWave and LTE network in an example scenario in which a macro cell overlays a small cell. A macro cell base station that serves as an attachment point of a booster eNB to the cellular network may be referred to as an "anchor eNB" or simply "anchor". The anchor eNB 300 connects to the core network 400 (Evolved Packet Core or EPC in LTE terminology) via an S1 interface and communicates with UE 100 via an LTE air interface. A backhaul link (e.g., an X2 interface) connects the anchor eNB 300 to the booster eNB 200. The backhaul link between the booster eNB 200 and the anchor eNB 300 may be a single point-to-point connection between booster and anchor, or it may be a multi-hop connection with a number of intermediate relay nodes. A booster may be also related by parallel links to an anchor, which allows the application of network coding. The booster eNB 200 communicates with UE 100 via an LTE interface and/or a mmWave interface. Because the coverage area of the booster eNB 200 is contained within the coverage area of the anchor eNB 300, this scenario may be referred to a capacity improvement type of deployment. FIG. 3 illustrates a different scenario in which part of the coverage area of the booster eNB 200 lies outside the coverage area of the anchor eNB 300. Also, there may not be a link between the anchor eNB 300 and the UE 100 and/or the booster eNB 200. This type of scenario may be referred to as a coverage extension type of deployment. Some scenarios may incorporate aspects of both coverage extension and capacity improvement deployments.

Described herein are traffic engineering functionalities in a heterogeneous network that includes an anchor serving a cellular macro cell and boosters serving mmWave enabled small cells that are designed to cope with dynamic changes of the heterogeneous environment. The changes may occur with varying dynamic nature, from mid-to-short term changes in channel propagation conditions such as rainfall to short term fading effects. They also may occur intentionally from longer term changes in the network setup to mid-term effects of energy saving mechanisms applied in the network. Among the parameters that describe the instantaneous heterogeneous environment that may change over time and result in dynamics the network has to deal with are the following: 1) availability of the anchor-booster-link (e.g., mmWave based), 2) availability of the anchor cell (macro cell) at the UE that is currently served by a booster, 3) availability of established beam forming functionality between UE and booster, and 4) availability of a control mode link between UE and booster (in absence of beam forming).

Besides the above-mentioned dynamic changes in the heterogeneous environment, the traffic engineering functionalities may also be impacted by the following factors that describe the available network setup. A first factor is whether the MCSC is deployed for coverage extension or capacity improvement. For a coverage extension deployment (i.e., enhancing the coverage into regions where the cellular system does not provide basic services) such as illustrated in FIG. 3, the booster eNB may not necessarily have connectivity to an anchor eNB (provided the separation of user plane and control plane traffic is out of scope for the coverage extension deployment). Also, dynamic changes in the macro cell-to-MCSC link may have a lower impact in the case of a coverage extension deployment. For capacity improvement deployments such as illustrated in FIG. 2, on the other hand, the booster eNB by definition has connectivity to an anchor eNB, and dynamic changes in the macro cell-to-MCSC link necessarily have higher impact. A second factor is whether the control and user planes between the booster eNB and anchor eNB are separated for MCSCs deployed for capacity improvement. A third factor is whether the booster eNB has the capability to provide an LTE air interface (Uu interface in 3GPP terminology) to serve the UEs.

Figure 4A:
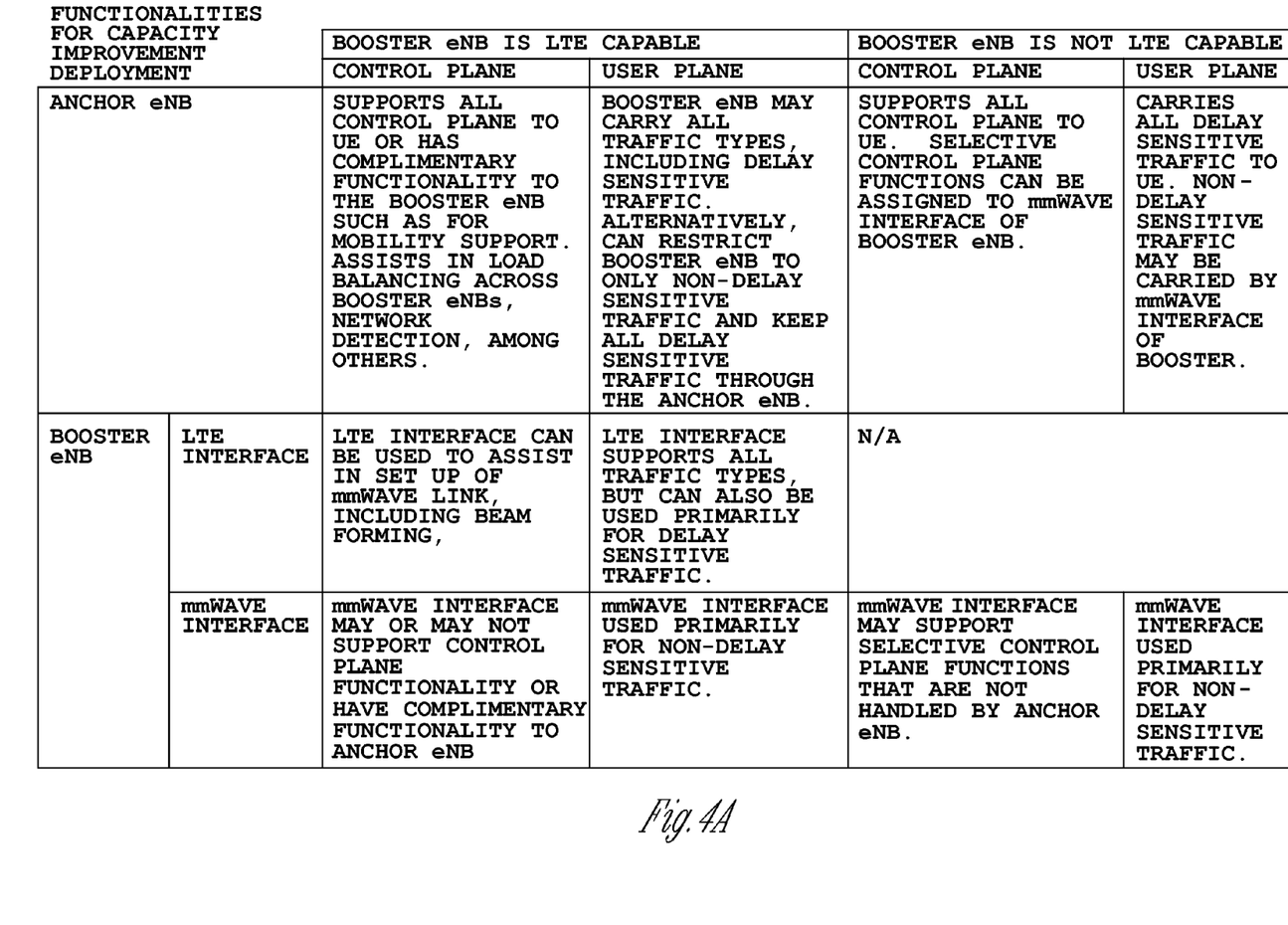
FIGS. 4A and 4B are tables that illustrate examples of anchor eNB and booster eNB functionalities for capacity improvement and coverage extension types of deployments, respectively in accordance with some embodiments.
Figure 4B:
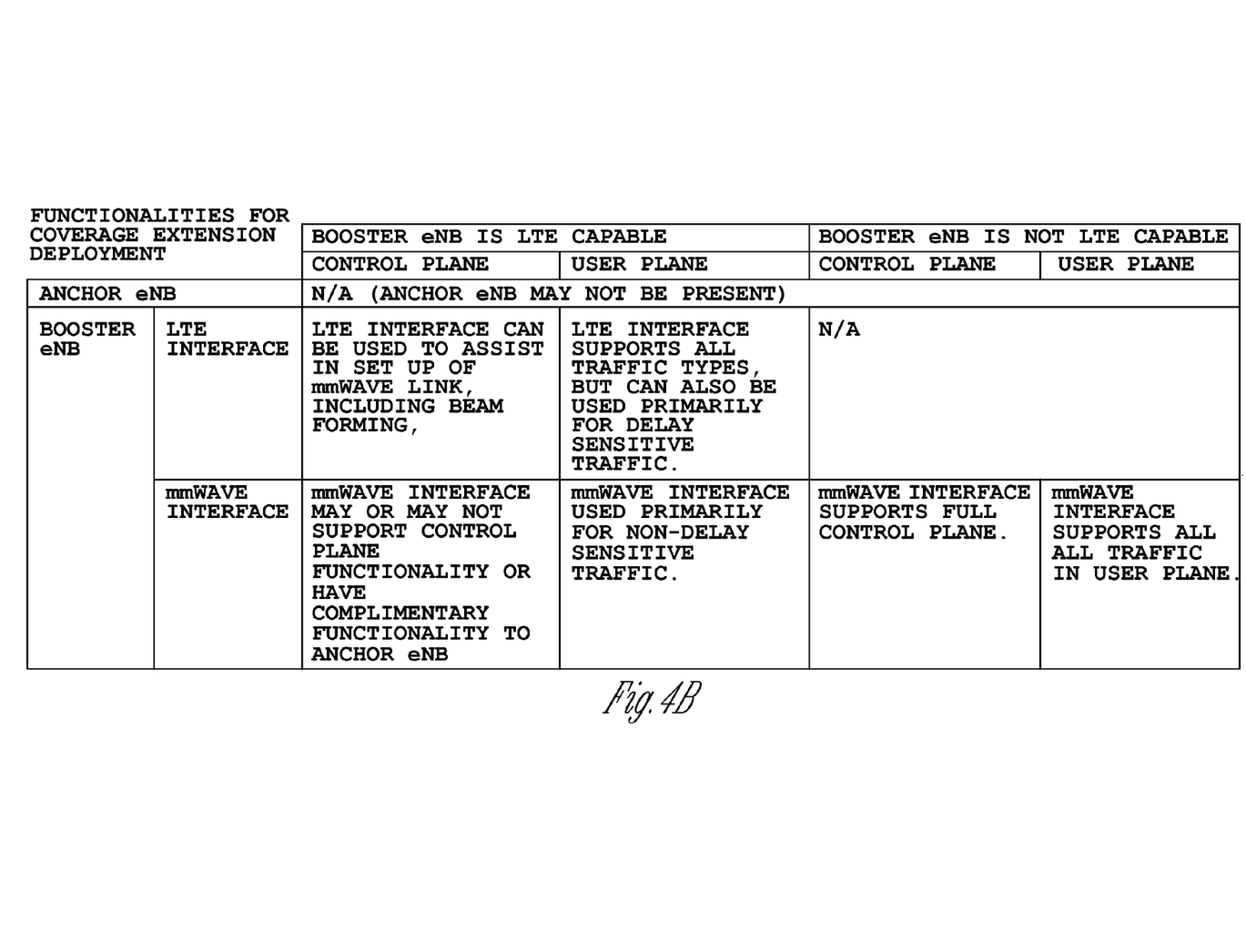

Depending upon the network configuration according to the above mentioned dynamic parameters and network setup factors, different alternatives to partition the functionalities and traffic between an anchor eNB and booster eNB emerge. FIGS. 4A and 4B are tables that illustrate different alternatives for partitioning the functionalities between the anchor eNB and the booster eNB depending upon the aforementioned factors. The table in FIG. 4A applies to capacity oriented MCSCs, while the table in FIG. 4B applies to coverage oriented MCSCs. For capacity oriented MCSCs, an anchor eNB should be able to dynamically reconfigure a booster eNB to behave according to the characteristics depicted in FIG. 4A. For coverage oriented eNBs, a booster eNB should be more autonomous to reconfigure itself according to the characteristics depicted in FIG. 4B. An important feature that should be noted from both FIG. 4A and FIG. 4B is the possibility to use the LTE Uu air interface, whether at the anchor eNB or booster eNB, to support mmWave link functionalities. That is, the legacy LTE Uu air interface may be used for mmWave link establishment, maintenance, and termination through the exchange of (c-plane) information, which comes along with the separation of user plane and control plane traffic. Given that the control mode of the mmWave link uses lower rates to compensate the lack of antenna gain, it becomes extremely important to quickly establish the beam forming link between a UE and the mmWave interface of the booster eNB. This establishment can be supported by the LTE interface and will thus be significantly accelerated.

Examples of dynamic change events that affect the network and countermeasures for dealing with those events will now be described. The events will be referred to by the following designations. Event ABL− is when the mmWave based anchor-booster-link drops or quality suffers below threshold (e.g., beam forming is lost due to loss of LOS (line of sight) or strong interferer appears Event ABL+ is when the mmWave based anchor-booster-link becomes available. Event UAL− is when the LTE based macro link (UE-to-macro cell) drops or quality suffers below threshold (e.g., the physical link suffers, heavy fading or cell overload occurs, the UE antenna is covered, or the UE at the cell edge leaves the macro cell without re-selection). Event UAL+ is when the LTE based macro link (UE-to-macro cell) becomes available. Event UBL− is when the UE-to-booster link drops completely and no control mode link available (e.g., due to a strong interferer), and event UBL+ is when the UE-to-booster control mode link becomes available. Event UBbf− is when the high data rate UE-to-booster link (with beam forming functionality) drops, but control mode link is still available (e.g., beam tracking fails due to unexpected UE movement). Event UBbf+ is when the high data rate UE-to-booster link (with beam forming functionality) is established from control mode link.

Events ABL−, UBbf−

Similar impacts to UE data transmission and reception in a capacity improvement type of deployment occur when either the mmWave based anchor-booster-link drops or when the high data rate UE-to-booster link (with beam forming functionality) drops with the control mode link still available. The path from UE via booster to anchor is not available in both events and the situation is expected to be resolved quickly for the following reasons: 1) the anchor-booster-link is expected to be generally available (no mobility of booster, mostly LOS) so that after the link drops a re-establishment may be expected quickly, and 2) if mmWave beam forming between the booster and UE fails but control link remains available, the beam forming (and thus high data rate capability of the link) is expected to be re-established quickly. If beam forming is lost, but a control link is still available between UE and booster, reestablishing of the beam forming is of highest priority to regain efficiency of the mmWave link. If a parallel LTE link is maintained to the booster or the macro station (for C-plane data in case of a C-/U-plane split or for other purposes), the UE may inform the booster and/or anchor immediately about the loss of beam forming to trigger support functionalities from the booster or macro station over LTE to re-gain beam forming. The same may be done by the booster eNB that detects the loss of beam forming to the UE if support via LTE is expected from macro station: The booster may inform the macro station about the need to contact the UE via LTE to re-gain beam forming quickly. For treatment of data to be transmitted over the lost mmWave link, three possible options are: 1) buffer data that was to be transmitted over the links (uplink buffering in the UE or booster and/or downlink buffering in macro station or booster, depending on capability and which link is dropped), 2) transmit data that was to be transmitted over the links alternatively over LTE directly to the macro station (maybe with increasing LTE link capacity), and 3) dropping data that was to be transmitted over the links (this option is the ultimate solution if buffering is not possible and LTE cannot be used). If there is a parallel LTE link to the macro station, it may be beneficial to transmit some or all of the data alternatively via this LTE link.

If a C-/U-plane split is used (i.e., if only U-plane is served by the mmWave booster link), a longer buffer period or even dropping data packets may be acceptable depending on QoS (quality of service) requirements of some bearers. Low latency data and/or data of low data rate may be transmitted along the path to the macro station using LTE as it is used for control information anyway. The decision which data to transmit via LTE has to be made by either of the impacted stations depending on the QoS per bearer. If also the C-plane is served by the booster (no split), there is generally no direct path available to the macro station. However, this path may be established using RACH (random access channel) procedures. To prevent too frequent usage of the RACH for this purpose, a timer-based approach may ensure the LTE path is only established if the mmWave booster link is dropped for long enough time because that would indicate problems with the mmWave link. If the booster itself was executing some radio resource control support functions beyond simple relaying of control data, these functions may have to be (temporarily) taken over by the macro station if the path via the booster is blocked. A handover of such functionality or a temporary parallel execution of such functionality may thus be required. If there is a parallel LTE link to the booster and the event is not ABL− (i.e., the anchor-booster-link is available), the bypassing methods noted above may apply also to this link instead of LTE link to the macro station. The data that is sent over LTE to bypass the dropped mmWave link may contain signaling that indicates the link problem and the (temporary) usage of LTE. In case no parallel LTE link can be used to reach the macro station, buffering and ultimately dropping packets may have to be applied along with intelligent solutions for prioritization of packets. In case a C-/U-plane split is possible in general (appropriate capability of UE, booster and anchor), but is not always applied, the decision to apply the split may be influenced by the number or frequency of such mmWave link dropping events occurring. If these events are frequent, a parallel LTE-link is beneficial and the C-plane could be covered reliably over that link. Also, a permanent shift of the C-plane from mmWave to LTE or vice-versa may be done depending on the occurrence of such dropping events.

In coverage extension types of deployments, the same countermeasures as discussed above may be applied with some exceptions. This is due to the fact that, in these type of deployments, there may be no alternative LTE link to the macro station.

Events ABL+, UBbf+

In case the problems with the mmWave link disappear, data transmission over mmWave can generally continue, and buffered data may be sent first to empty the buffers. Alternatively, the impacted stations may decide to keep the mmWave link up for some time before relying on it for data transmission. For example, if control data was transmitted over LTE after the dropping event occurred, this control data may be kept in LTE for a longer period than user data, so it may be important to ensure that the mmWave link is robust before C-plane traffic is moved back to the mmWave link. If functionality beyond relaying was moved from booster to macro eNB, after this event it may be moved back, either immediately or after a timer expiration to prevent too frequent functionality handovers.

Event UAL−

If the link between the UE and the macro station drops while the link with the booster eNB is still available, all data may be transmitted via the mmWave booster link. Especially if a C-/U-plane split were applied, the control data may be transmitted via the booster cell indicating a reason why the alternative route was used. Basically this event converts the capacity deployment into a coverage deployment, since the coverage of the macro cell is (temporarily) dropped. Timer-based buffering may also be applied to give the macro cell LTE link a chance to be reestablished and prevent switching of transmission paths too often. Alternatively, instead of a timer-based solution, measurement results from LTE connection re-establishment and/or cell search may be taken into account to evaluate the chance of re-establishment in by a specified due time.

Event UAL+

When the macro station become available again, the measures discussed above with respect to the UAL− event can be reverted. Again, timers may prevent too frequent path switching. Basically, this event converts a coverage extension type of deployment into a capacity improvement type of deployment, since the coverage of the macro cell is re-established.

Event UBL−

In case the UE loses the mmWave link to the anchor completely, re-establishment of that link is the key to efficiently transmit data. A parallel LTE link to either the booster of the macro station may be used similarly to the UBbf− event to trigger a support function by the respective LTE station. The support function in this case may be to trigger beacon transmission by the mmWave booster and/or exchange timing information for such beacon transmissions. Data transmission and possibly functionality handover from booster to anchor may be treated similarly as for events ABL− and UBbf−, as in all of the cases data transmission via the mmWave booster link is not possible.

Event UBL+

If the mmWave control link becomes available, information via LTE may be sent to trigger support for beam forming establishment during the control phase. Data transmission and functionality handover are not impacted as the control link does not offer data transmission capabilities.

Example of LTE-Assisted Network Operation

Figure 5A:
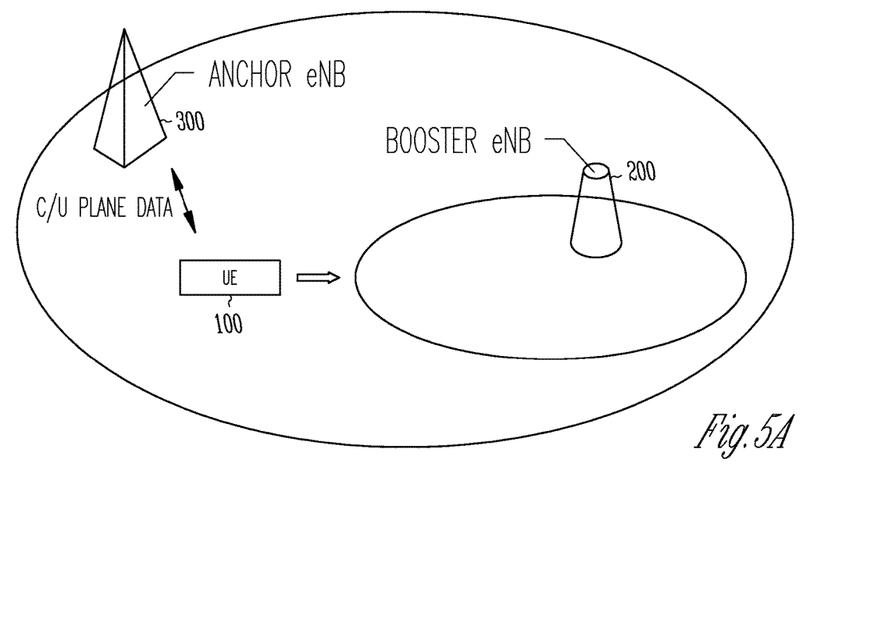
FIGS. 5A to 5C illustrate examples of LTE-assisted network operation as a UE moves into the coverage area of a booster eNB in accordance with some embodiments.
Figure 5B:
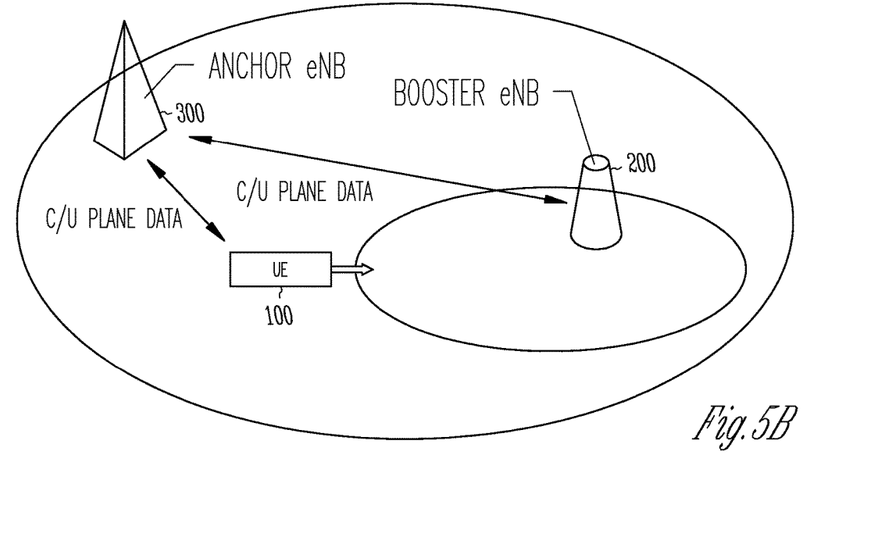
Figure 5C:
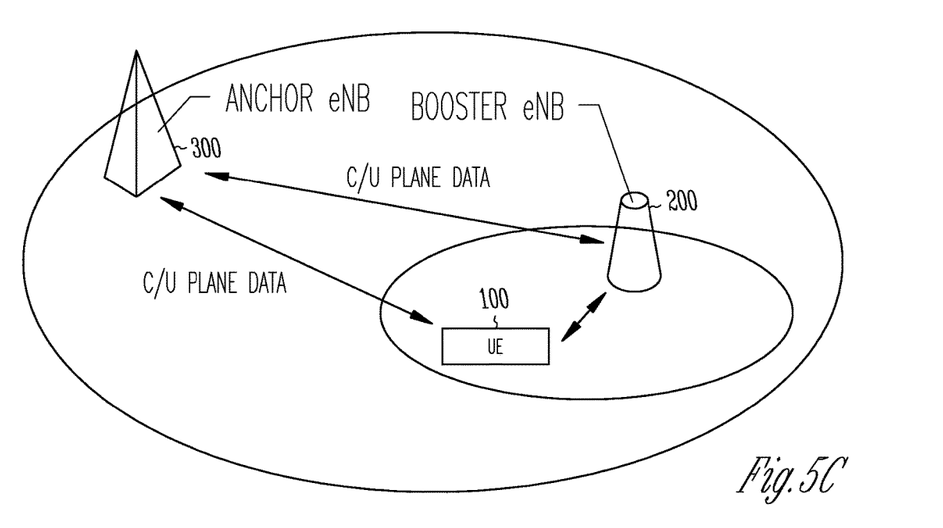

FIGS. 5A through 5C illustrate an example of LTE-assisted operation as a UE 100 within the coverage area of an anchor eNB 300 moves into the coverage area of a booster eNB 200. In FIG. 5A, UE 100 communicates both user and control data only via the anchor eNB 300. The anchor eNB would typically have information as to the location of all booster eNBs overlain by the macro cell and their coverage. When UE 100 is located outside the coverage area of booster eNB 200, anchor eNB 300 maintains the connection with UE 100. Anchor eNB also has information as to the location and movement of UE 100. In FIG. 5B, when anchor eNB 300 detects that UE 100 is approaching the booster cell served by booster eNB 200, it notifies booster eNB 200 on the arrival of the UE and transfers relevant U-plane data of the UE to the booster eNB. The anchor eNB may also notify the UE as to the location of the booster eNB. In FIG. 5C, when the UE 100 comes into the coverage range of the booster cell, the UE performs beam forming training with the booster eNB 200. After beam forming training, the booster eNB 200 may schedule time for data exchange between the UE and booster eNB. The UE may also keep its connection with the anchor eNB for C-plane data and delay sensitive U-plane data.

Example Embodiments

In Example 1, a method for operating a user equipment (UE) device comprises: operating a radio transceiver to provide an LTE (Long Term Evolution) interface for communicating with an anchor eNB (evolved Node B) or a booster eNB; operating a radio transceiver to provide a mmWave (millimeter wave) interface for communicating with the booster eNB in either a control mode or a beam forming mode that establishes a beam forming link between the UE and the booster eNB; transmitting and receiving control plane data over the LTE interface; transmitting and receiving user plane data over the mmWave interface in the beam forming; and, when the beam forming link between the UE and the booster eNB is lost, transmitting uplink user plane data over the LTE interface along with an indication of the loss of the beam forming link to trigger one or more support functions by the booster eNB or anchor eNB for enabling the UE to regain the beam forming link.

In Example 2, the subject matter of Example 1 may optionally include, when the beam forming link is lost and an indication of such is transmitted over the LTE air interface, receiving information from the anchor eNB for regaining the beam forming link that includes the location of the booster eNB.

In Example 3, the subject matter of any of the preceding examples may optionally include, when the beam forming link is lost but the control mode over the mmWave interface is still available, attempting to regain the beam forming link by communicating with the booster eNB over the mmWave interface in the control mode using an omnidirectional antenna.

In Example 4, the subject matter of any of the preceding examples may optionally include, if secondary control plane functions are handled by the booster eNB over the mmWave interface in addition to primary control plane functions handled by the anchor eNB over the LTE interface, receiving a handover of the secondary control plane functions from the booster eNB to the anchor eNB when the beam forming link over the mmWave interface is lost.

In Example 5, the subject matter of any of the preceding examples may optionally include, when a handover of secondary control plane functions from the booster eNB to the anchor eNB has been received due to interruption of the beam forming link and the beam forming link is subsequently regained, moving user plane traffic to the mmWave interface before moving control plane traffic to the mmWave interface.

In Example 6, the subject matter of any of the preceding examples may optionally include, transmitting and receiving delay sensitive user plane data over the LTE interface.

In Example 7, a method for operating a user equipment (UE) device comprises: operating a radio transceiver to provide an LTE (Long Term Evolution) interface for communicating with an anchor eNB (evolved Node B) or a booster eNB; operating a radio transceiver to provide a mmWave (millimeter wave) interface for communicating with the booster eNB in either a control mode or a beam forming mode that establishes a beam forming link between the UE and the booster eNB; transmitting and receiving user and control plane data over the mmWave interface in the beam forming mode; and, when the beam forming link between the UE and the booster eNB is lost, performing a random access procedure over a random access channel (RACH) of the LTE interface to establish an LTE connection with the anchor eNB or booster eNB and transmitting uplink user and control plane data over the LTE interface along with an indication of the loss of the beam forming link to trigger one or more support functions by the booster eNB or anchor eNB for enabling the UE to regain the beam forming link.

In Example 8, the subject matter of Example 7 may optionally include the subject matters of any of Examples 2 through 6.

In Example 9, a non-transitory computer-readable storage medium contains instructions for execution by one or more processors of a UE to perform operations to configure the UE perform any of the methods recited in Examples 1 through 8.

In Example 10, a UE comprises: a radio transceiver to provide an LTE (Long Term Evolution) interface for communicating with an anchor eNB (evolved Node B) or a booster eNB; a radio transceiver to provide a mmWave (millimeter wave) interface for communicating with the booster eNB in either a control mode or a beam forming mode that establishes a beam forming link between the UE and the booster eNB; and processing circuitry to perform any of the methods recited in Examples 1 through 8.

In Example 11, a method for operating a booster eNB (evolved Node B) within a macrocell of an anchor eNB, comprises: transmitting and receiving user plane data to and from a UE (user equipment) over an mmWave (millimeter wave) interface in either a control mode or a beam forming mode that establishes a beam forming link between the UE and the booster eNB; when the beam forming link over the mmWave interface is detected to have been lost, transmitting an indication of the loss of the beam forming link to the anchor eNB over a backhaul link that instructs the anchor eNB to contact the UE over an LTE interface with support information for regaining the beam forming link.

In Example 12, the subject matter of Example 11 may optionally include transmitting and receiving delay-sensitive user plane data to and from the UE over an LTE interface.

In Example 13, the subject matter of any of Examples 11 through 12 may optionally include moving user plane data communications with the UE to an LTE interface when the beam forming link over the mmWave interface is detected to have been lost.

In Example 14, the subject matter of any of Examples 11 through 13 may optionally include transmitting and receiving control plane data to and from the UE over the mmWave interface.

In Example 15, the subject matter of any of Examples 11 through 14 may optionally include moving user plane and control data communications with the UE to an LTE interface when the beam forming link over the mmWave interface is detected to have been lost.

In Example 16, the subject matter of any of Examples 11 through 15 may optionally include, when user and control plane traffic is moved from the mmWave interface to the LTE interface due to loss of the beam forming link and the beam forming link is subsequently regained, moving user plane traffic back to the mmWave interface before moving control plane traffic back to the mmWave interface.

In Example 17, a non-transitory computer-readable storage medium contains instructions for execution by one or more processors of an eNB to perform operations to configure the eNB perform any of the methods recited in Examples 11 through 16.

In Example 18, a booster eNB comprises a radio transceiver, backhaul transceiver, and processing circuitry to perform any of the methods recited in Examples 11 through 16.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. For more information with respect to UTRAN LTE standards, see the 3rd Generation Partnership Project (3GPP) standards for UTRAN-LTE, release 12, including variations and evolutions thereof. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user equipment (UE) device, comprising:
a radio transceiver to provide an LTE (Long Term Evolution interface for communicating with an anchor eNB (evolved Node B) or a booster eNB;
a radio transceiver to provide a mmWave (millimeter wave) interface for communicating with the booster eNB in either a control mode or a beam forming mode that establishes a beam forming link between the UE and the booster eNB;
processing circuitry to:
transmit and receive control plane data over the LTE interface;
transmit and receive user plane data over the mmWave interface in the beam forming mode; and,
when the beam forming link between the UE and the booster eNB is interrupted, transmit uplink user plane data over the LTE interface along with an indication of the interruption of the beam forming link to trigger one or more support functions by the booster eNB or anchor eNB for enabling the UE to regain the beam forming link.

2. The UE of claim 1 wherein the processing circuitry is to, when the beam forming link is interrupted and an indication of such is transmitted over the LTE air interface, receive information from the anchor eNB for regaining the beam forming link that includes the location of the booster eNB.

3. The UE of claim 1 wherein the processing circuitry is to, when the beam forming link is interrupted but a control mode over the mmWave interface is still available, attempt to regain the beam forming link by communicating with the booster eNB over the mmWave interface in the control mode using an omnidirectional antenna.

4. The UE of claim 1 wherein, if secondary control plane functions are handled by the booster eNB over the mmWave interface in addition to primary control plane functions handled by the anchor eNB over the LTE interface, the processing circuitry is to receive a handover of the secondary control plane functions from the booster eNB to the anchor eNB when the beam forming link over the mmWave interface is lost.

5. The UE of claim 4, wherein, when a handover of secondary control plane functions from the booster eNB to the anchor eNB has been received due to beam forming link loss and the beam forming link is subsequently regained, processing circuitry is to move user plane traffic to the mmWave interface before moving control plane traffic to the mmWave interface.

6. The UE of claim 1 wherein the processing circuitry is further to trans and receive delay sensitive user plane data over the LTE interface.

7. A method for operating a user equipment (UE) device, comprising:
   operating a radio transceiver to provide an LTE (Long Term Evolution) interface for communicating with an anchor eNB (evolved Node B) or a booster eNB;
   operating a radio transceiver to provide a mmWave (millimeter wave) interface for communicating with the booster eNB in either a control mode or a beam forming mode that establishes a beam forming link between the UE and the booster eNB;
   transmitting and receiving control and user plane data over the mmWave interface in the beam forming mode; and,
   when the beam forming link between the UE and the booster eNB is interrupted, performing a random access procedure over a random access channel (RACH) of the LTE interface to establish an LTE connection with the anchor eNB or booster eNB and transmitting uplink user and control plane data over the LTE interface along with an indication of the loss of beam forming to trigger one or more support functions by the booster eNB or anchor eNB for enabling the UE to regain the beam forming link.

8. The method of claim 7 further comprising, when the beam forming link is lost and an indication of such is transmitted over the LTE air interface, receiving information from the anchor eNB for regaining beam forming that includes the location of the booster eNB.

9. The method of claim 7 further comprising, when the beam forming link lost but the control mode over the mmWave interface is still available, attempting to regain the beam forming link by communicating with the booster eNB over the mmWave interface in the control mode using an omnidirectional antenna.

10. The method of claim 7 further comprising, when the beam forming link is interrupted, performing the random access procedure to establish an LTE connection with the anchor eNB or booster eNB only after a specified time delay during which the beam forming link remains lost.

11. The method of claim 7 further comprising, when user and control plane traffic is moved from the mmWave interface to the LTE interface due to loss of the beam forming link and the beam forming link is subsequently regained, moving user plane traffic back to the mmWave interface before moving control plane traffic back to the mmWave interface.

12. A method for operating a booster eNB (evolved Node B) within a macrocell of an anchor eNB, comprising:
   transmitting and receiving user plane data to and from a UE (user equipment) over an mmWave (millimeter wave) interface in either a control mode or a beam forming mode that establishes a beam forming link between the UE and the booster eNB;
   when the beam forming link over the mmWave interface is detected to have been lost, transmitting an indication of the loss of the beam forming link to the anchor eNB over a backhaul link that instructs the anchor eNB to contact the UE over an LTE interface with support information for regaining the beam forming link.

13. The method of claim 12 further comprising transmitting and receiving delay-sensitive user plane data to and from the UE over an LTE interface.

14. The method of claim 12 further comprising moving user plane data communications with the UE to an LTE interface when the beam forming link over the mmWave interface is detected to have been lost.

15. The method of claim 12 further comprising transmitting and receiving control plane data to and from the UE over the mmWave interface.

16. The method of claim 15 further comprising moving user plane and control data communications with the UE to an LTE interface when the beam forming link over the mmWave interface is detected to have been lost.

17. The method of claim 16, further comprising, when user and control plane traffic is moved from the mmWave interface to the LTE interface due to loss of the beam forming link and the beam forming link is subsequently regained, moving user plane traffic back to the mmWave interface before moving control plane traffic back to the mmWave interface.

18. A non-transitory computer-readable storage medium that stores instructions for execution by one or more processors of a user equipment to perform operations to configure a UE (user equipment) to:
   transmit and receive control plane data over an LTE interface to an anchor eNB (evolved Node B) or a booster eNB;
   transmit and receive user plane data over an mmWave interface to the booster eNB in either a control mode or a beam forming mode that establishes a beam forming link between the UE and the booster eNB; and,
   when the beam forming link between the UE and the booster eNB is lost, transmit uplink user plane data over the LTE interface along with an indication of the loss of the beam forming link to trigger one or more support functions by the booster eNB or anchor eNB for enabling the UE to regain the beam forming link.

19. The medium of claim 18 further comprising stored instructions to, when the beam forming link is lost and an indication of such is transmitted over the LTE air interface, receive information from the anchor eNB for regaining the beam forming link that includes the location of the booster eNB.

20. The medium of claim 18 further comprising stored instructions to, when the beam forming link is lost but the control mode over the mmWave interface is still available, attempt to regain the beam forming link by communicating with the booster eNB over the mmWave interface in the control mode using an omnidirectional antenna.

\* \* \* \* \*

UNITED STATES PATENT AND TRADEMARK OFFICE
CERTIFICATE OF CORRECTION

PATENT NO. : 9,713,129 B2
APPLICATION NO. : 14/577766
DATED : July 18, 2017
INVENTOR(S) : Cordeiro et al.

Page 1 of 1

It is certified that error appears in the above-identified patent and that said Letters Patent is hereby corrected as shown below:

In the Claims

Column 10, Line 48-49, Claim 1, after "Evolution", insert --)--

Column 11, Line 29, Claim 6, delete "trans" and insert --transmit-- therefor

Signed and Sealed this
Twenty-first Day of April, 2020

Andrei Iancu
*Director of the United States Patent and Trademark Office*